United States Patent Office 3,242,022
Patented Mar. 22, 1966

3,242,022
GELLED NITROALKANE COMPOSITIONS FOR BLASTING
Bobby L. Atkins, Lake Jackson, and Robert N. Bashaw, Freeport, Tex., assignors to The Dow Chemical Company, Midland, Mich., a corporation of Delaware
No Drawing. Filed Sept. 27, 1963, Ser. No. 312,008
6 Claims. (Cl. 149—89)

The invention is a new gelled composition of matter.

Many reactive materials of a chemical nature which are highly desirable for use to attained specific purposes exist normally as liquids but, in such state, are often difficult or impossible to employ in compositions intended for use in specific instances.

One recourse is to gel the liquid or mixture of liquids. Gelling agents are known, some of which are quite satisfactory for given liquids when used for specific purposes. However, nearly all chemical groups of known liquids and mixtures thereof are unique in the kinds of gelling agents to which each responds at operative temperatures. Some gelling agents, although giving a satisfactory gelled state in some instances, render the gelled composition unsuitable for a specific use because the chemical nature of the gelling agent interferes with the ultimate intended use, either by reacting with the liquid being gelled or by being rendered incompatible with other materials with which the gelled composition comes in contact during use. Among particular uses of gelled liquids are those requiring a combustible composition wherein the rate of combustion must be controlled.

We have discovered that the specific polymer, viz., cross-linked poly-(N-vinylpyrrolidone), when admixed with a mono-nitroalkane, wherein the alkane group contains from 1 to 4 carbon atoms, produces a gelled composition of exceptional utility for use requiring a combustible gelled solid.

The amount by weight of the polymer to employe in the composition of the invention is between about 0.3 and about 10.0%, based upon the dry weight of nitroalkane employed.

Poly-(N-vinylpyrrolidine) may be prepared by polymerizing N-vinylpyrrolidone either through the mechanism of a cross-linking agent or by irradiation.

Poly-(N-vinylpyrrolidone) for use in the composition of the invention may be prepared by mixing N-vinylpyrrolidone with divinylbenzene and a catalytic amount of α,α'-azobisisobutyronitrile in an aqueous solution, preferably heating the reaction mixture, e.g., at between about 90 degrees and 100 degrees C. Best results are obtained in the presence of an inorganic salt, e.g., MgSO₄. Other cross-linking agents may be employed, e.g., N,N'-methylenebisacrylamide and the divinyl ether of diethylene glycol.

Illustrative of a procedure for preparing cross-linked poly-(N-vinylpyrrolidone) employing representative proportions of the reactants, in parts by weight is as follows: 100 parts of N-vinylpyrrolidone, 1.0 part of divinylbenzene, and 0.3 part of α,α'-azobisisobutyronitrile are admixed in a suitable reaction kettle. The mixture so made is heated at a temperature between room temperature and the reflux temperature for from 0.5 to 1.0 hour. The cross-linked, water-swellable poly-(N-vinylpyrrolidone) is thus produced, and is readily separated from the reaction medium by known physical separation techniques. It is preferably thereafter dried before use in the invention.

A further illustrative procedure for preparing the cross-linked poly-(N-vinylpyrrolidone) useful in making the composition of the invention is as follows: an aqueous solution of about 50% by weight N-vinyl-2-pyrrolidone is subjected to a dose of 0.805 megarad from a 3500 curie cobalt-60 source of gamma rays at a dosage rate of 0.3 megarad per hour. The resulting polymer so made is then dried in an oven, e.g., at 125 degrees C. for about 8 hours and subsequently ground to a powder of a particle size that will substantially all pass through about a No. 48 sieve but be retained on about a No. 150 sieve (U.S. Bureau of Standards Sieve Series).

Of course, it also is possible to use radiation together with the cross-linking agent, in which case the radiation functions as an initiator in place of the α,α'-azobisisobutyronitrile. This method requires much less dose of radiation than the second method above.

The polymer thus prepared, as suggested above, is then admixed with a nitroalkane, e.g., nitropropane. It is recommended that the polymer be added to the nitroalkane slowly accompanied by agitation until a firm particulate gel is formed. To illustrate, a preferred practice of the invention, the cross-linked poly-(N-vinylpyrrolidone) so made is added to nitropropane until the resulting gel formed consists of about 3 parts by weight of the polymer and about 97% by weight of nitropropane.

The gelled composition of the invention is combustible and may conveniently be forced into cavities and voids as needed. It is readily deformable, taking the shape of and filling the cavities or voids; it is capable of completely filling such cavities or voids when but a relatively small pressure is applied.

The composition of the invention clearly has obvious uses in the gelation of fuels and the preparation of combustible compositions of the nature of nitroalkanes which have applicable utility in blasting and earth moving operations.

Having described our invention what we claim and desire to protect by Letters Patent is:

1. A combustible gelled composition of matter consisting essentially of a nitroalkane containing between 1 and 4 carbon atoms per molecule and cross-linked poly-(N-vinylpyrrolidone) in an amount of each sufficient to provide between 0.3 and 10.0% by weight of the polymer based on the weight of nitroalkane.

2. The combustible gelled composition of claim 1 wherein the nitroalkane is nitropropane and the polymer is that prepared by polymerizing, in the presence of a cross-linking agent the monomer having the formula:

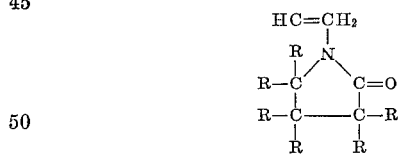

wherein R is independently selected from the class consisting of hydrogen and lower alkyl groups containing from 1 to 3 carbon atoms per molecule.

3. The combustible gelled composition of claim 1 wherein the polymer is prepared by polymerizing a 10 to 60% by weight aqueous solution of N-vinylpyrrolidone with a cross-linking agent selected from the class consisting of divinylbenzene, divinyl ether of ethylene glycol, and N,N'-methylenebisacrylamide, in the presence of a free-radical promoting catalyst, the amount of the cross-linking agent employed being sufficient to provide between about 0.02 and about 2.5% by weight thereof, based on the N-vinylpyrrolidone employed.

4. The combustible gelled composition of claim 1 wherein polymerization and cross-linking are effected by irradiating an aqueous solution of the monomer at a concentration of between about 2% and 60% by weight of the aqueous solution of monomer and cross-linking agent, for a time sufficient to polymerize substantially all the N-vinylpyrrolidone present.

5. A combustible gelled composition of matter consisting essentially of a nitroalkane containing between 1 and 4 carbon atoms per molecule and a cross-linked polymer of N-vinyl-2-pyrrolidone wherein said cross-linked polymer is prepared by irradiating a solution of N-vinyl-2-pyrrolidone containing a minor amount of a cross-linking agent.

6. In a method of preparing a solid propellant, the improvement which consists essentially of admixing a $C_1$ to $C_4$ nitroalkane which is liquid at normal temperature and pressure with a polymer prepared by polymerizing in the presence of a small but effective cross-linking agent, a monomer having the formula

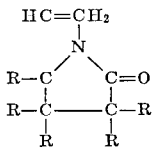

wherein R is selected from the class consisting of hydrogen and lower alkyl groups containing 1–3 carbon atoms per molecule.

References Cited by the Examiner
UNITED STATES PATENTS

| | | | |
|---|---|---|---|
| 2,992,908 | 7/1961 | Hedrick et al. | 149—19 |
| 3,035,948 | 5/1962 | Fox | 149—89 X |
| 3,035,950 | 5/1962 | Long | 149—89 X |
| 3,070,471 | 12/1962 | Roy | 149—89 X |

REUBEN EPSTEIN, *Primary Examiner.*

CARL D. QUARFORTH, *Examiner.*